US010987992B2

(12) United States Patent
Harms et al.

(10) Patent No.: US 10,987,992 B2
(45) Date of Patent: Apr. 27, 2021

(54) REAR PARTITION MOUNTED COOLING SYSTEM

(71) Applicant: Trinity Innovative Solutions, LLC, Little Elm, TX (US)

(72) Inventors: Dwight David Harms, The Colony, TX (US); Timothy Francis Hall, The Colony, TX (US)

(73) Assignee: TRINITY INNOVATIVE SOLUTIONS, LLC, Little Elm, TX (US)

( * ) Notice: Subject to any disclaimer, the term of this patent is extended or adjusted under 35 U.S.C. 154(b) by 173 days.

(21) Appl. No.: 15/791,148

(22) Filed: Oct. 23, 2017

(65) Prior Publication Data
US 2019/0118609 A1   Apr. 25, 2019

(51) Int. Cl.
*B60H 1/00* (2006.01)
*B60H 3/02* (2006.01)
*B60H 3/06* (2006.01)

(52) U.S. Cl.
CPC ..... *B60H 1/00271* (2013.01); *B60H 1/00414* (2013.01); *B60H 1/00564* (2013.01); *B60H 1/00885* (2013.01); *B60H 3/024* (2013.01); *B60H 3/0658* (2013.01); *B60H 2001/003* (2013.01)

(58) Field of Classification Search
CPC ............ B60H 1/00271; B60H 1/00414; B60H 1/00564; B60H 1/00885; B60H 2001/003; B60H 3/0658
See application file for complete search history.

(56) References Cited

U.S. PATENT DOCUMENTS

| 1,853,459 | A | | 4/1932 | Russell et al. |
| 3,237,545 | A | | 3/1966 | Gillick et al. |
| 3,274,915 | A | | 9/1966 | Ziegenfelder |
| 3,943,726 | A | | 3/1976 | Miller |
| 4,558,634 | A | | 12/1985 | Oshiro et al. |
| 4,834,615 | A | * | 5/1989 | Mauch ............... F24F 13/32 |
| | | | | 415/213.1 |
| 4,942,921 | A | | 7/1990 | Haessig et al. |
| 4,955,203 | A | | 9/1990 | Sundhar |

(Continued)

FOREIGN PATENT DOCUMENTS

| JP | 08268046 A | * 10/1996 | |
| JP | 2002254924 A | * 9/2002 | |
| WO | WO-0061397 A1 | * 10/2000 | ............. B60H 1/243 |

*Primary Examiner* — Steven S Anderson, II
(74) *Attorney, Agent, or Firm* — David W. Carstens; J. Andrew Reed; Carstens & Cahoon LLP (57) ABSTRACT

The disclosure describes a system and method for the environmental control of a vehicle having a cargo area and an environmentally controlled passenger area with a partition between the passenger area and the cargo area. The environmental control being directed and performed by an environmental control unit that can include one or more fans, a control module, a mounting plate, and a directional manifold to control the direction of the airflow. The environmental control unit can be installed using a method that includes attaching a fan unit to the mounting plate, connecting the fan unit to the control module, coupling to the fan unit and/or the control module to a power supply, and attaching a directional manifold to control the direction of airflow in or out of the fan unit.

16 Claims, 12 Drawing Sheets

(56) References Cited

U.S. PATENT DOCUMENTS

| | | |
|---|---|---|
| 4,986,169 A | 1/1991 | Chen |
| 5,167,573 A | 12/1992 | Kanno et al. |
| 5,205,781 A | 4/1993 | Kanno et al. |
| 5,205,782 A | 4/1993 | Ohba |
| 5,413,528 A | 5/1995 | Pabst et al. |
| 5,779,536 A | 7/1998 | McCorkel et al. |
| 5,839,293 A | 11/1998 | Teitelbaum et al. |
| 6,068,551 A | 5/2000 | Oremland |
| 6,186,886 B1 | 2/2001 | Farrington et al. |
| 6,224,479 B1 * | 5/2001 | Iino .................. B60J 1/20 454/132 |
| 6,361,429 B1 * | 3/2002 | Pawlak, III ........ B60H 1/00207 454/139 |
| 6,474,089 B1 | 11/2002 | Chen |
| 7,396,075 B2 * | 7/2008 | Ohkuma .................. B60K 1/04 296/65.05 |
| 7,699,096 B2 | 4/2010 | Naruse et al. |
| 8,632,046 B2 * | 1/2014 | Sun .................. H05K 7/20181 248/674 |
| 8,821,224 B2 | 9/2014 | Alexander et al. |
| 9,410,717 B2 | 8/2016 | Marleau et al. |
| 2002/0072321 A1 | 6/2002 | Kowalski et al. |
| 2002/0173264 A1 | 11/2002 | Ottman et al. |
| 2003/0109214 A1 | 6/2003 | Yamashiro |
| 2004/0031248 A1 * | 2/2004 | Lindsay ............ B01D 46/0023 55/385.3 |
| 2004/0219874 A1 | 11/2004 | Karadia |
| 2005/0003751 A1 | 1/2005 | Thomas |
| 2005/0011692 A1 * | 1/2005 | Takahashi ............... B60R 16/04 180/68.5 |
| 2006/0080986 A1 | 4/2006 | Inoue |
| 2006/0270332 A1 | 11/2006 | Kober et al. |
| 2008/0085672 A1 | 4/2008 | Creed et al. |
| 2009/0088064 A1 | 4/2009 | Lin |
| 2009/0191805 A1 | 7/2009 | Cusumano et al. |
| 2009/0199572 A1 | 8/2009 | Klein et al. |
| 2011/0298241 A1 * | 12/2011 | Varns ................ B60H 1/00014 296/64 |
| 2012/0160446 A1 | 6/2012 | Creed et al. |
| 2013/0045108 A1 * | 2/2013 | Zhou .................... F04D 29/602 416/244 R |
| 2014/0315478 A1 | 10/2014 | Kim |
| 2015/0246592 A1 * | 9/2015 | Fisher .................... B60H 1/245 454/143 |

* cited by examiner

REAR PARTITION MOUNTED COOLING SYSTEM

BACKGROUND OF THE INVENTION

Technical Field

The present disclosure relates to vehicles, and internal fan systems for vehicles. More particularly, and not by way of limitation, the present disclosure is directed to a system and method for circulating air from the passenger area of a vehicle into the cargo area of a vehicle to cool and dissipate heat generated by sensitive electronic equipment stored in the cargo area while in use. Additionally, the present disclosure is directed to the exchange of air from two areas of different temperatures, accordingly it can move higher temperature air to an area with a lower temperature or move lower temperature air to an area with a higher temperature.

Description of Related Art

Vehicles have become an indispensable tool for law enforcement and security personnel. Vehicles can be, but are not limited to, cars, trucks, vans, cargo containers, trains, airplanes, or ships. This includes not only getting personnel to distant locations quickly, but also transporting any necessary equipment. As technology and crime have become more sophisticated, so too has the equipment used to investigate and surveil crime. For example, vehicles used in undercover operations, as well as marked patrol cars, now have remotely operated Digital Video Recorders (DVRs) and other imaging equipment that record events within and external to the vehicle. To avoid detection of these DVRs and imaging devices in undercover operations, the equipment is often stored in the trunk, storage, or cargo area of the vehicle or in other non-descript locations. However, the equipment can produce a significant amount of heat during its operation. Equipment used during investigations and other surveillance operations is sensitive to excessive heat, and if placed in the cargo area of a vehicle while in use without any ventilation will likely degrade in performance or result in the failure of the equipment because of the heat.

This is due in part to the fact that a cargo area of a vehicle can often be significantly hotter than the outside air or the air in the passenger compartment of the vehicle. The cargo area itself works as a barrier to dissipating the excessive heat produced by the equipment. In some cases, windows can act as magnifying glasses that also increase the ambient air within a vehicle. Much of this produced heat is then reflected back toward the equipment in use that further exacerbates the problem. On top of this, the vehicle may be positioned in a location that leaves it exposed to direct sunlight and painted a color that increases the heat absorption of the cargo area of the vehicle. In addition, the vehicle may be left alone without an available operator or user(s) to manually initiate cooling of the cargo area.

Now, there are devices directed toward moving cooler air from the passenger area of a vehicle into the cargo area of a vehicle to cool the area inside the cargo area. However, these devices are directed toward general commercial vehicles and do not have the same requirements as a device designed for use by law enforcement or security personnel. Specifically, users in a commercial vehicle would be worried about keeping groceries cool while in the cargo area of a vehicle contemporaneous with the vehicle being operated by the user. Devices designed to work with commercial vehicles are directed toward use while the car is on, and the driver is actively moving from one location to another. This is in contrast to law enforcement or security personnel who may be using the equipment in the cargo area of the vehicle for extended periods of time while the vehicle is not turned on or is not being driven from one location to another. Alternatively, the vehicle may not be in use for an extended period, and the equipment in the cargo area may be hot because the vehicle has been left unattended in a location with direct or indirect exposure to the sun. Users may have an immediate need for the use of the equipment when they return to the vehicle and do not have time to wait for an existing system to cool the equipment prior to use. Furthermore, law enforcement, security, or surveillance equipment may be more sensitive to other environmental factors such as humidity or harmful air particles. Current systems would not filter the air or help decrease the humidity in the air being circulated into the cargo area from the passenger area.

It would be advantageous to have a system and method for moving cool air from the passenger compartment of a vehicle that overcomes the disadvantages of the prior art with regards toward the specific needs of law enforcement and security personal.

BRIEF SUMMARY

The present disclosure is a rear partition mounted cooling system that is mounted in or on a rear partition of a vehicle that circulates air or an air current from a passenger area into a cargo area of a vehicle, such as but not limited to a vehicle used for surveillance activities. The rear partition mounted cooling system includes at least one fan, a mount for holding said fan(s) in position, a manifold or ductwork for directing the air at a specific location, and a controller module for determining when the air or air current is to be circulated into the cargo area of the vehicle. In operation, the controller module will determine when the temperature in the cargo area has risen to a certain temperature and will engage the fan to begin circulating cool air from the passenger area into the cargo area.

This rear partition mounted cooling system circulates the cooler air or air currents into the cargo area and thereby cools off any equipment enclosed or stored inside the cargo area. Much of the equipment can be sensitive to heat and will degrade in performance or cease working altogether if the internal components of the equipment exceed a specific heat threshold. The circulated air or air currents cools the equipment by directing air or air currents toward the equipment, or in certain embodiments a vacuum effect that pulls warm or heated air or air currents away from the equipment. In addition, the circulated air or air currents push excess heat away from the equipment and can result in an increase in the equipment's efficiency, thereby maintaining the performance of the equipment and increasing the longevity of it as well. The equipment's components degrade over time, and successive overheating increases the speed of degradation as well as decreasing the operational shelf life of the equipment. Decreasing the successive strain from overheating prolongs the usefulness of the equipment and ensures that it continues to work properly.

The system can be engaged automatically or manually by the user. End users of the equipment may be away from the vehicle with the equipment actively operating while stored in the cargo area. The equipment needs to be ready to function at the moment that the user requires and the user may not have time to wait for the equipment to cool off. Thus, the equipment needs to be continuously cooled by the fan system while the user is away from the vehicle. By having the system function on its own, the equipment can continue to stay cool and functional even if the user is incapable of monitoring the condition of the equipment before use.

An alternative embodiment of the instant disclosure includes two or more fans. This can be useful because one or more of the fans output could be directed by the directional manifold at a specific piece of equipment, while the other fan or fans can be directed at cooling the entire cargo area. Alternatively, one fan can be directed in a manner that pulls cooler or cold air or air currents from the passenger area into the cargo area, while the other fan pulls warmer or hot air or air currents from the cargo area and vents it to the passenger area or outside. The directional manifold can be made of a hard or flexible material and can be shaped or sized to correspond with the size and shape of the targeted equipment. This exemplary embodiment can be used for one or more specific pieces of equipment inside the cargo area that get significantly hotter than the rest of the equipment, and a special allotment of cooler air is desired to be directed at or onto them.

The fans can be arranged in an assortment of configurations to suit the needs of the user. For example, they can be arranged to angle away from each other and circulate the cooler air around the cargo area in a particular manner. The angle is not limited to any specific angle. In addition, the fans can be configured to circulate air in opposite directions. For example, one or more fans can circulate cooler air from the passenger area into the cargo area while the other fans circulate hotter air from the cargo area into the passenger area.

In addition, various modifications can be made to the fan system depending on the sensitivity of the equipment in the cargo area. The modifications can be used by themselves or combined with others. For instance, a filter can be installed to the system to filter out the air if there is a concern that harmful particles will be circulated from the passenger area into the equipment. In addition, if there is a concern about humidity damaging the equipment, a desiccant can be inserted to help lower the humidity of the air that the rear partition mounted cooling system circulates into the cargo area.

Thus, in one aspect, the present disclosure is directed to a rear partition mounted cooling system that can be installed in a vehicle that may be used by law enforcement or security personnel that keeps equipment cool that is located in a cargo area.

In another aspect, the present disclosure is directed to a system with an integrated controller module that can engage the fan system without manual input by a user so that the system can be running even if the user is not around the vehicle to turn it on or is incapable of turning it on at the desired moment in time.

In yet another aspect, the present disclosure is directed to a directional manifold that can direct air at one or more specific pieces of equipment that may be in need of a special allotment of air.

In still another aspect, the present disclosure is directed to a set of modifications that can be inserted to mitigate harm to equipment stored in the cargo enclosure from harmful air particles, the presence of humidity, or similar environmental hazards.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE INVENTION

Figure 7:
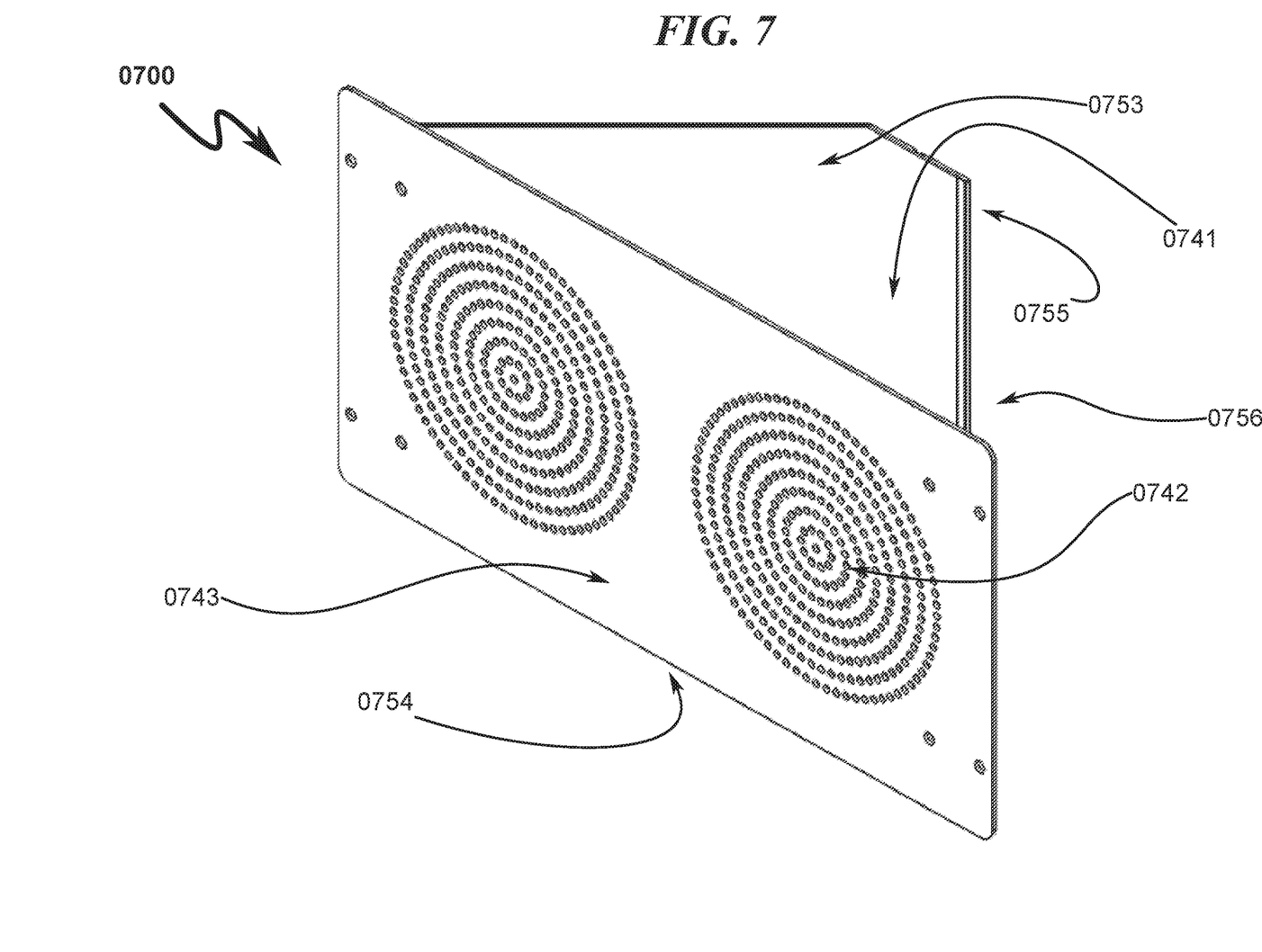
FIG. 7 is a perspective view of an alternate embodiment of the rear partition mounted cooling device depicting the top and front portions of the device with the cover plate attached.
Figure 8:
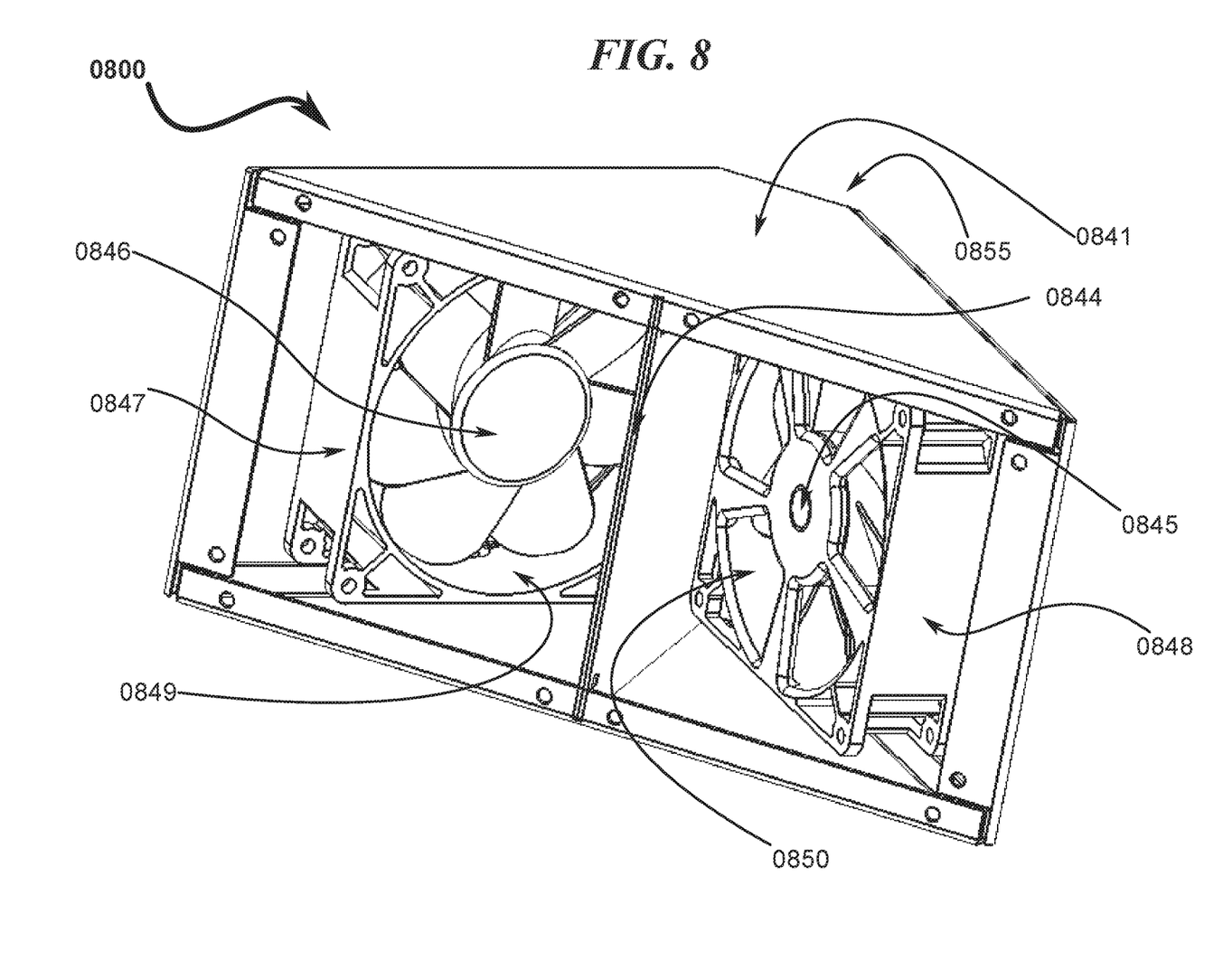
FIG. 8 is a perspective view of an alternate embodiment of the rear partition mounted cooling device depicting the top and front portions of the device with the cover plate removed.
Figure 9:
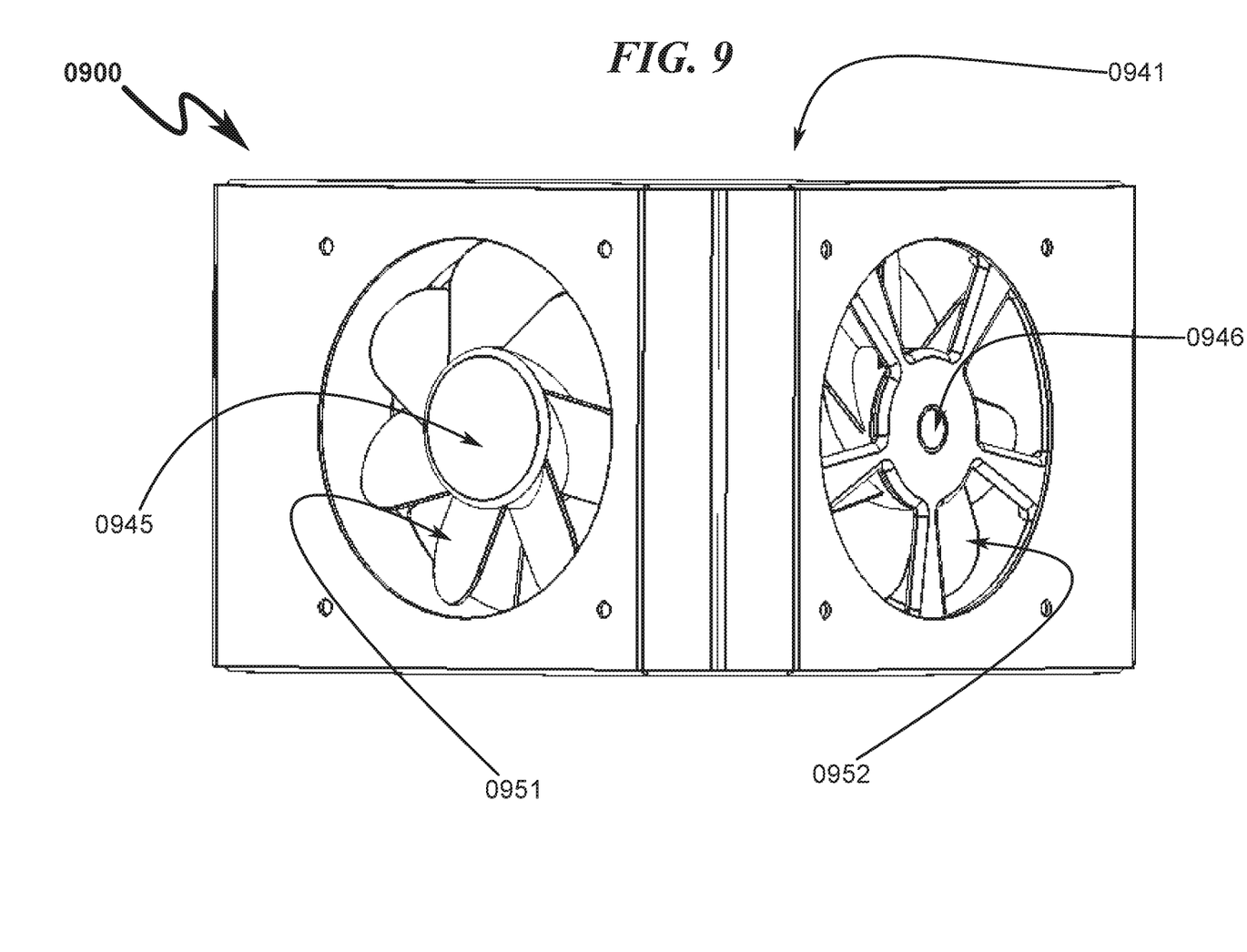
FIG. 9 is a perspective view of an alternate embodiment of the rear partition mounted cooling device depicting the bottom of the device.

An exemplary embodiment of the invention will now be described. Now referring in general to FIG. 1, set forth is a top view 0100 of an embodiment of the present disclosure 0101 that is an environmental control apparatus for use in a vehicle having a cargo area and an environmentally controlled passenger area with a deck or partition between the passenger and cargo areas. The apparatus of the exemplary embodiment of the present disclosure having a mounting plate 0102 and a fan unit 0103 that includes at least one fan. The fan unit(s) 0103 having at least one motor corresponding to the at least one fan(s). The mounting plate is constructed of any rigid material and has an upper surface 0104 and a lower surface 0205, which is further illustrated in FIG. 2. In the center of the mounting plate 0102 is a large centrally located aperture 0106. The fan unit 0103 has illustrated in the exemplary embodiment a first fan 0107 and a second fan 0108, which are located underneath the lower surface 0105 of mounting plate 0102. Alternate embodiments of the present invention can have one or more fans within the fan unit 0103. Cooling devices other than fans may be used as well. The first fan 0107 and second fan 0108 are placed side-by-side such that the center of a partition 0153 between them is centrally aligned with the center of the centrally located aperture 0106. The partition 0153 in a preferred embodiment is created by an enclosure for said fans 0107 or 0108 of the at least one fan unit 0103, wherein the enclosure of two fans that are adjacent to each other creates a partition 0153 that is double in thickness of the enclosure of one fan. It would be understood that if only one fan is utilized then a partition 0153 might not be present, and/or not centrally aligned with the center of the centrally located aperture 0106. The fans are not required to be side-by-side and can be arranged in any configuration. For example, in an alternate embodiment, first fan 0107 and second fan 0108 could be arranged to be set ninety degrees to each other, as shown in FIGS. 7-9, or set one hundred eighty degrees to each other.

Figure 1:
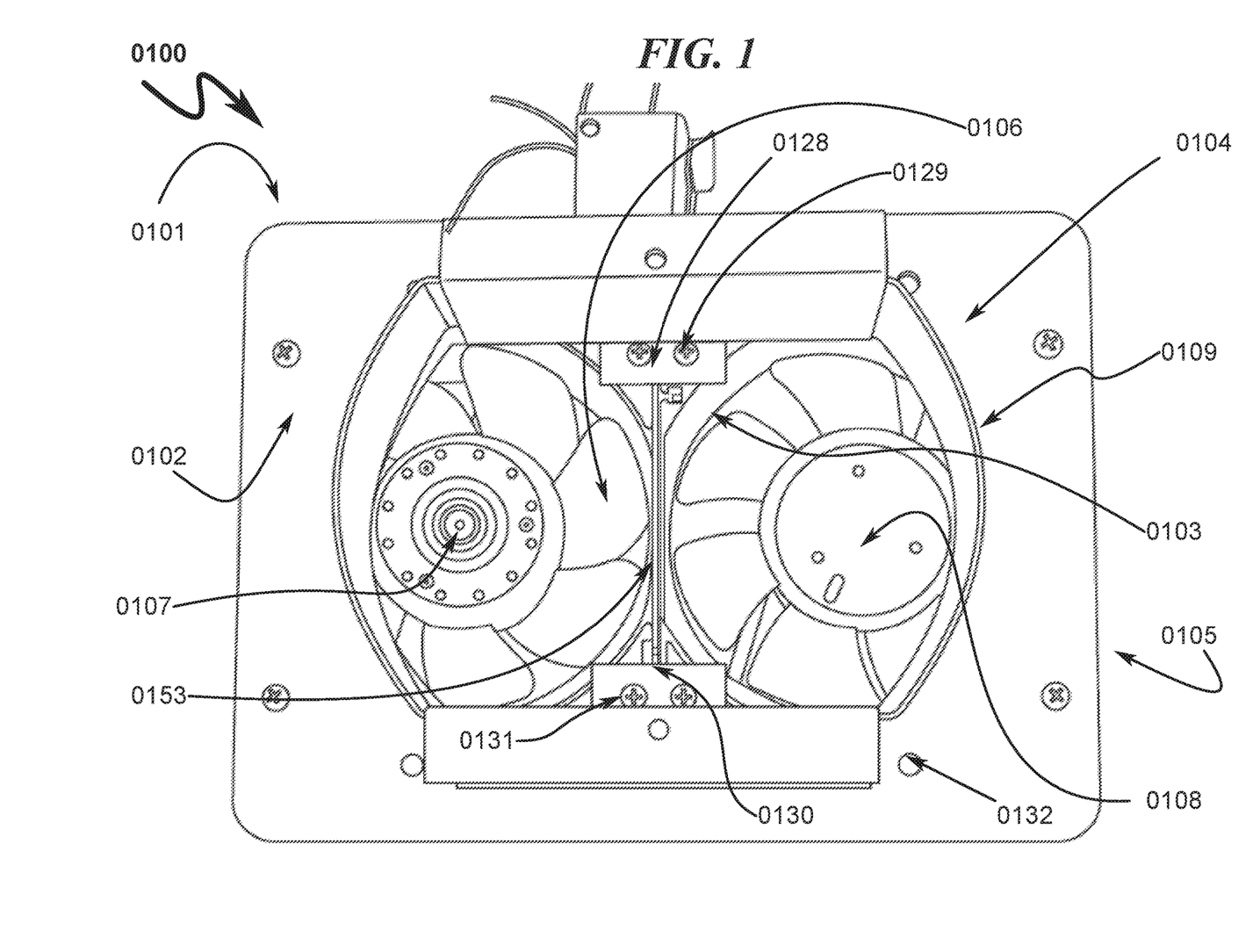
FIG. 1 is a top view of the rear partition mounted cooling device.

The mounting plate 0102 has an attachment plate(s) 0109 with a concave shape opening that is centrally located with the centrally located aperture 0106 to assist in the movement of air or air currents by said fans 0107 or 0108. The enclosure for the fans of the at least one fan unit(s) 0103 can have any shape that corresponds to the shape of the fan blades in order to provide an efficient movement of air. An alternate embodiment may not have any enclosure for said fans as it is not required, or there could be multiple enclosures of varying shapes and dimensions or an enclosure made of multiple pieces or elements of varying shapes and dimensions that may be interconnected. Additionally, the attachment plate(s) 0109 is connected to the mounting plate 0102 and perpendicularly protrudes outwardly away from it, typically as an upward or downward protrusion. The enclosure and the attachment plate(s) 0109 may be constructed of any rigid material, such as, but not limited to, hard plastics, wood, metal, or any combination thereof.

Figure 2:
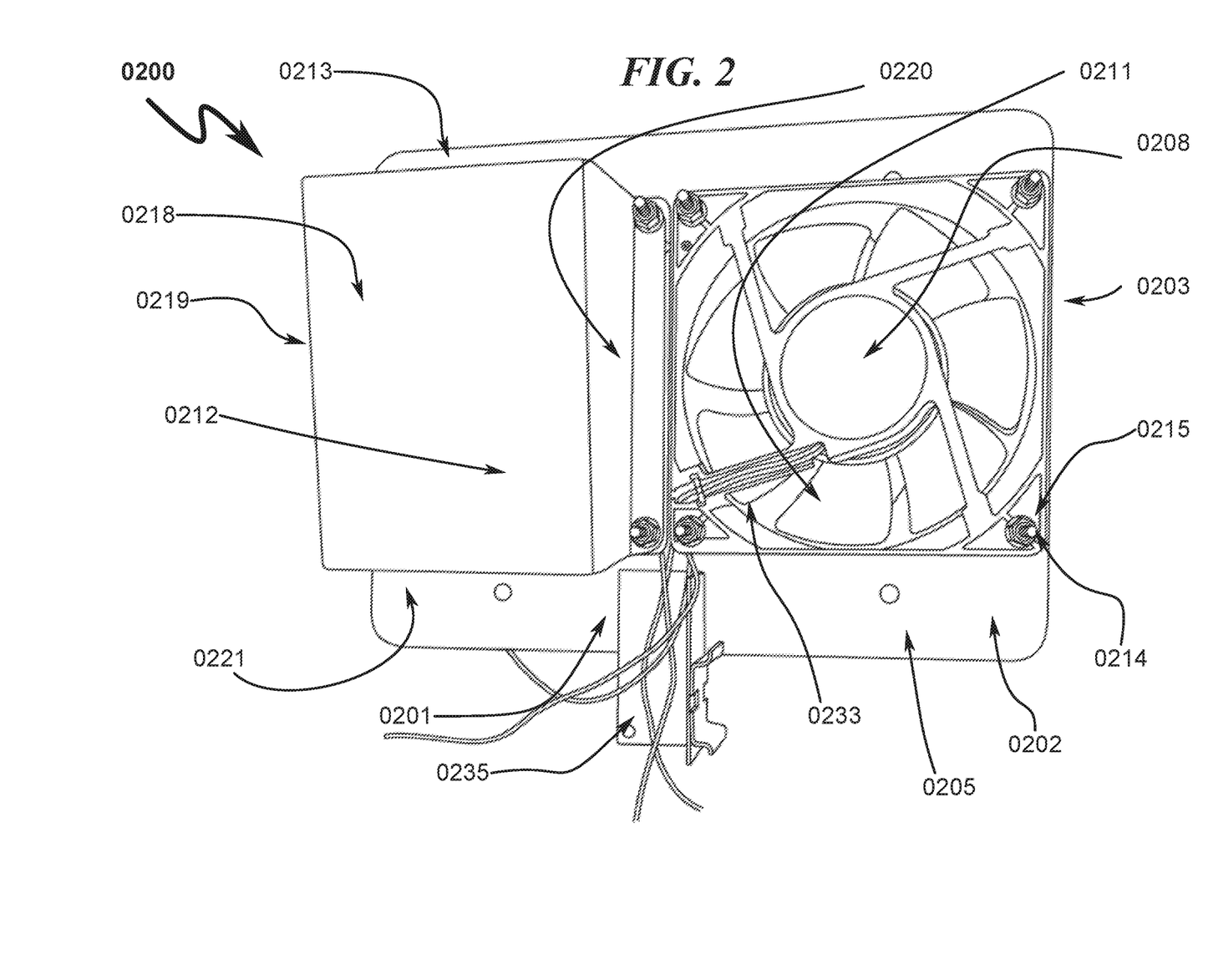
FIG. 2 is a bottom view of the rear partition mounted cooling.

An alternate embodiment may have a filter placed in or on the enclosure(s) for at least one of the at least one fan unit(s) 0103 or, on or within one of the attachment plate(s) 0109 to filter the air entering the centrally located aperture 0106. The filter is not required to be in or on the enclosure(s) for at least one of the at least one fan unit(s) 0103 or, on or within one of the attachment plate(s) 0109, it could be in between the fan unit(s) 0103 and the directional manifold 0212, as seen in FIG. 2, or anywhere in the device that is a path for air to flow through the centrally located aperture 0106. Also, an alternate embodiment may have a desiccant, desiccant pad, or desiccant pod, or some combination thereof can be placed in or on the enclosure(s) for at least one of the at least one fan unit(s) 0103 or, on or within one of the attachment plate(s) 0109 to reduce the relative humidity of the air passing through the centrally located aperture 0106. The desiccant is not required to be in or on the enclosure(s) for at least one of the fan unit(s) 0103 or, on or within one of the attachment plate(s) 0109, it could be in between the fan unit 0103 and the directional manifold 0212, as seen in FIG. 2, or anywhere in the device that is a path for air to flow through the centrally located aperture 0106.

An exemplary embodiment includes mounting tab 0128 that is physically a part of the mounting plate 0102, and it protrudes parallel and adjacent to the fan unit 0103. Mounting tab 0128 penetrates into the space occupied by the centrally located aperture 0106 at the top and center space of the centrally located aperture 0106. The mounting plate 0102 and the fan unit 0103 are connected together via the mounting tab 0128 and the corresponding mounting screws 0129. Mounting tab 0130 is physically a part of the mounting plate 0102, and it protrudes parallel and adjacent to the fan unit 0103. Mounting tab 0130 penetrates into the space occupied by the centrally disposed aperture 0106 at the bottom and center space of the centrally disposed aperture 0106. Mounting screws 0131 hold the mounting plate 0102 and the fan unit 0103 together via the mounting tab 0130. The mounting plate 0102 comprises deck-mounting holes 0132, and each deck mounting hole 0132 is located equidistant from the nearest corner. Mounting holes 0132 allow for a variety of fasteners to be coupled with the mounting deck 0102 to create a secure mount on the partition between the passenger compartment and the cargo enclosure. It would be understood that other locations on the mounting plate 0102 and the mounting tabs 0128 or 0130 could be used for the mounting screws 0129 or 0131 and the mounting hole 0132.

FIG. 2 sets forth a bottom view 0200 of the present disclosure 0201. A mounting plate 0202 has an upper surface (not shown) and a lower surface 0205. Attached to the lower surface 0205 is at least one fan unit 0203. The fan unit 0203 can contain a fan 0208 that in a preferred embodiment has an enclosure, i.e., is enclosed within the fan unit 0203. However, it would be understood that a fan unit 0203 could also be a standalone fan 0208 without any enclosure. It would also be understood that each of the at least one fan(s) 0208 must also have a power source. The power source will typically be a wired connection 0233 or in alternative embodiments, an attachable battery or alternative power source. The wired connection 0233 can also lead to a controller module that can provide power and/or control signals to the fan unit 0203. The fan unit 0203 as illustrated in an exemplary embodiment has opening(s) 0211 for directing or ducting air or air currents generated by the fan 0208 through the fan unit 0203.

In one alternative embodiment, there can also be a directional manifold 0212 attached directly to the lower surface 0205 or to one of the at least one fan unit 0203. The direction manifold 0212 has a front side 0213, a back side 0221, a left side 0219, a right side 0220, and a bottom side 0218. In some embodiments, the sides 0213, 0218-0221, could also be called plates as well. It would be understood that each of the sides 0213, 0218-0221 could be removed individually or in an ordered combination in order to direct air or air currents towards or in the direction of a specific section of a vehicle cargo area. In one embodiment, a piece of delicate and sensitive piece of electronic surveillance equipment is stored in the specific section of a vehicle cargo area, and requires additional air flow above and beyond that required by other pieces of equipment. An alternate embodiment may have the directional manifold 0212 underneath different portions of the at least one fan unit 0203. The directional manifold is not required to be directly underneath the output of the at least one fan unit 0203. The coupling of the various plates can occur by constructing the directional manifold 0212 by a single piece of material or by alternate means such as welding. Bottom plate 0218, a side plate 0219, a side plate 0220, and a back plate 0221 can be constructed out of any rigid material. Alternate embodiments may contain extra plates or have no plates at all. The directional manifold 0212 can have a wide variety of different shapes and does not have to be constructed using any rigid material. The material could be flexible or malleable.

The directional manifold 0212 and the at least one fan unit 0203 can be attached to the mounting plate 0202 through a fastener 0214 and a fastener securing mechanism 0215. In a preferred embodiment, the fastener 0214 would be, but is not limited to, a threaded bolt or screw, and the fastener securing mechanism 0215 would be, but is not limited to, a nut or locking nut. There can also be additional pieces of equipment or securing mechanisms, such as, but not limited to, a mounting arm 0235. The mounting arm 0235 allows for the mounting plate 0202 to be attached to other pieces of equipment, and in a preferred embodiment can be utilized to further secure the mounting plate 0202 to the rear partition of a vehicle or other instalment position.

Figure 3:
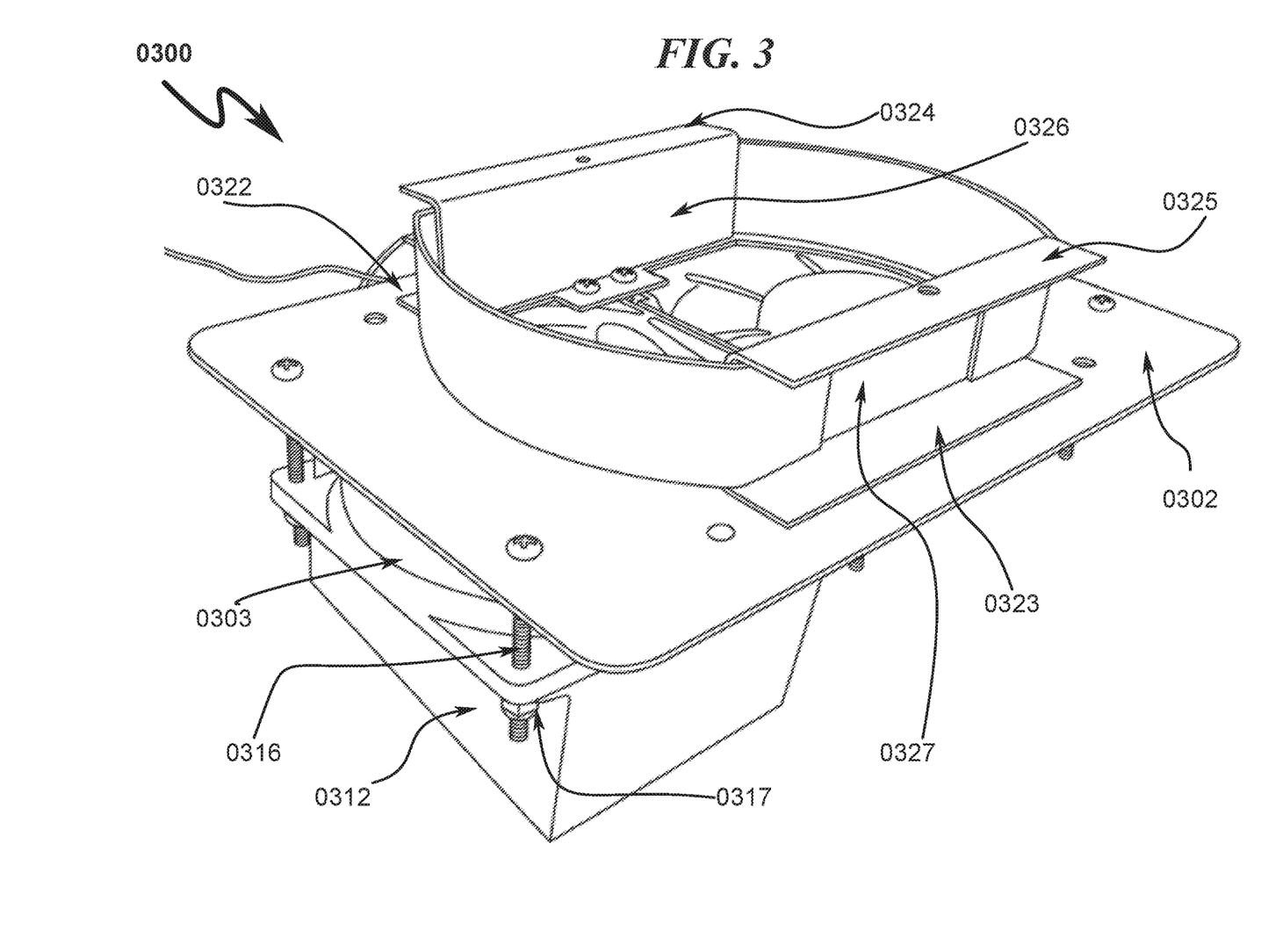
FIG. 3 is a perspective view from the left side of the rear partition mounted cooling device depicting the top and rear portions of the device.
Figure 4:
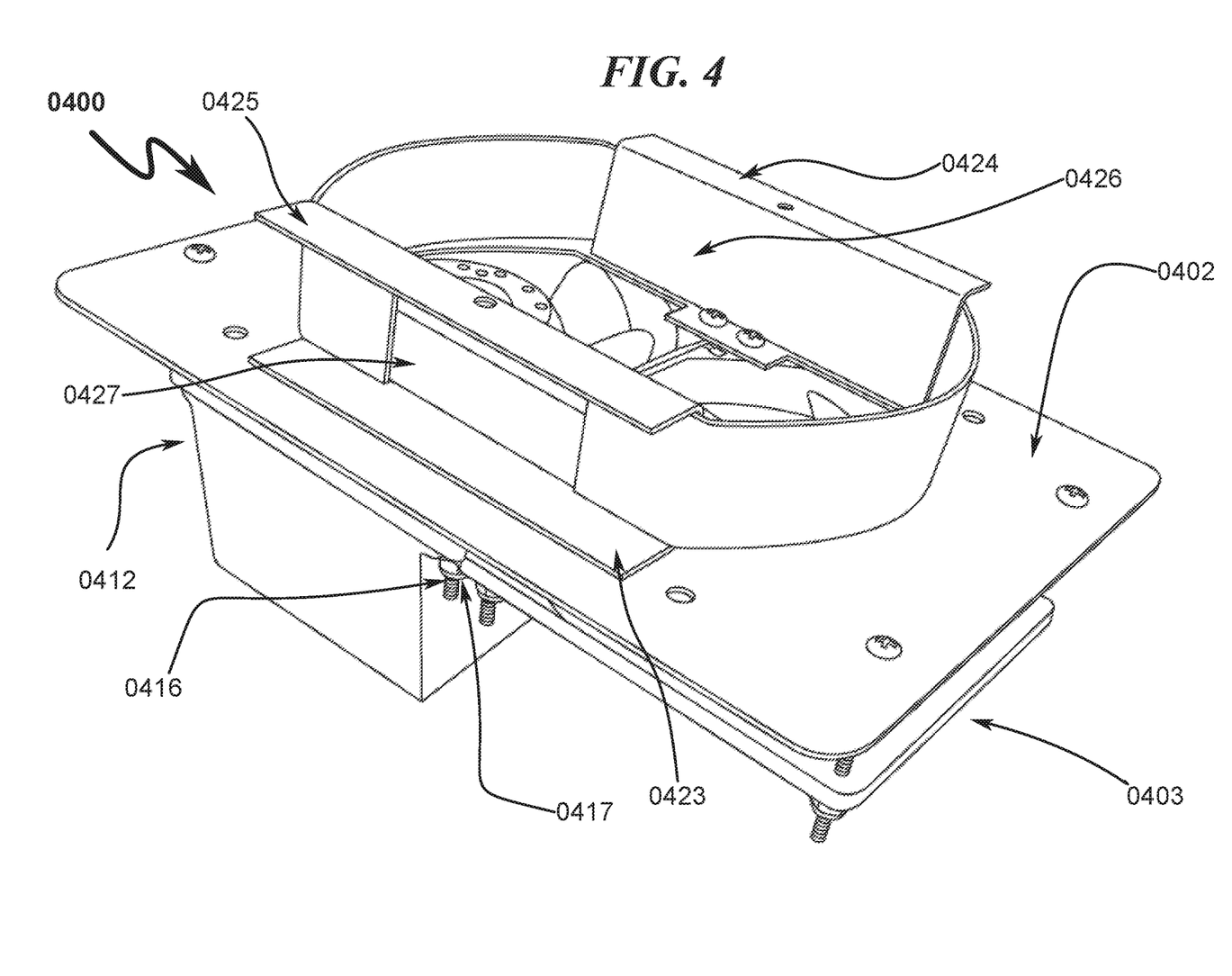
FIG. 4 is a perspective view from the right side of the rear partition mounted cooling device depicting the top and rear portions of the device.
Figure 5:
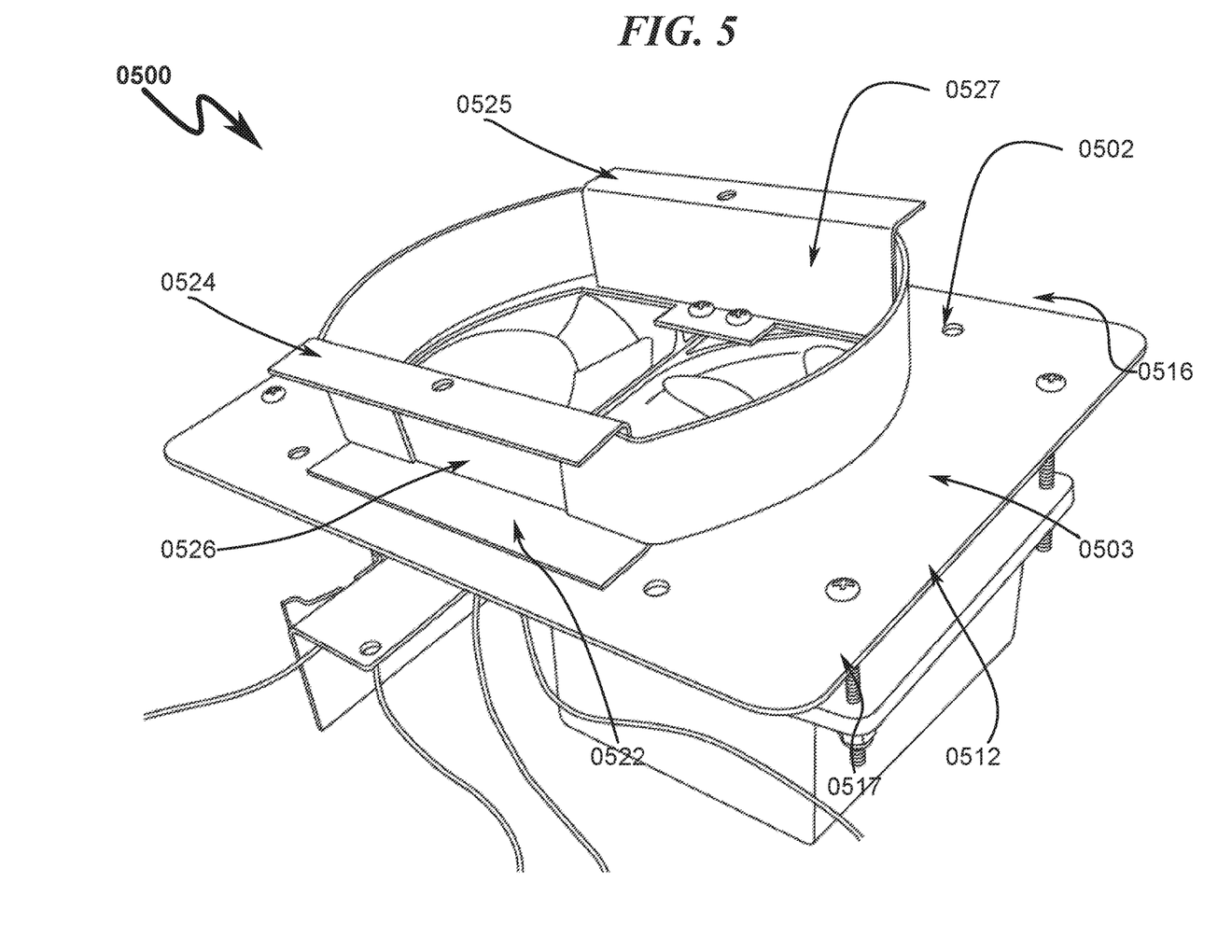
FIG. 5 is a perspective view from the right side of the rear partition mounted cooling device depicting the top and front portions of the device.

FIGS. 3-5 set forth perspective views 0300, 0400, and 0500 of an exemplary embodiment of the present disclosure. At least one fan units 0303/0403/0503, in one embodiment each at least one fan unit 0303/403/503 is attached by a fastener 0316/0416/0516 that would be, but is not limited to, a threaded bolt or screw that passes through the mounting plate 0302/0402/0502, into the top of the at least one fan unit 0303/0403/0503 and out of the bottom of the at least one fan unit 0303/0403/0503, and through the directional manifold 0312/0412/0512 to be secured by a fastener securing mechanism 0317/0417/0517 wherein the fastener securing mechanism 0317/0417/0517 would be, but is not limited to, a nut or locking nut. However, in alternative embodiments the fastener securing mechanism 0317/0417/0517 could also be a portion of the mounting plate 0302/0402/0502, directional manifold 0312/0412/0512, or one of the at least one fan unit(s) 0303/0403/0503.

The lower lip of cover bracket 0322/0522, along with lower lip of cover bracket 0323/0423, are parallel to the mounting plate 0302/0402/0502. The lower lip of cover bracket 0322/0522 and lower lip of cover bracket 0323/0423 can be connected to the mounting plate 0302/0402/0502 through a fastener 0316/0416/0516, a welding or other physical connection, such as, but not limited to, glue, nails, screws, bolts, nuts, tape, magnets, magnetic or electromagnetic force, or any combination thereof. Parallel to lower lip of cover bracket 0322/0522 is the upper lip of cover bracket 0324/0424/0524. Parallel to lower lip of cover bracket 0323/0423 is the upper lip of cover bracket 0325/0425/0525. The extender plate of cover bracket 0326/0426/0526 protrudes outward from the mounting plate 0302/0402/0502 and perpendicular to the lower lip of cover bracket 0322/0522. In addition, the extender plate of cover bracket 0327/0427/0527 protrudes outward from the mounting plate 0302/0402/0502 and perpendicular to the lower lip of cover bracket 0323/0423. The lower lip of cover bracket 0322/0522, the lower lip of cover bracket 0323/0423, the extender plate of cover bracket 0326/0426/0526, and the extender plate of cover bracket 0327/0427/0527 are not necessary for the device and can be left off. In addition, they can be constructed by any sort of rigid material, such as, but not limited to, metal, plastic, wood, alloy, carbon fiber, or any combination thereof. Furthermore, it would also be understood that lower lip of cover bracket 0322/0522, the lower lip of cover bracket 0323/0423, the extender plate of cover bracket 0326/0426/0526, and the extender plate of cover bracket 0327/0427/0527 can be designed and configured to attach to only certain sections of said mounting plate 0302/0402/0502 and/or portions of the central aperture as seen in FIG. 1.

Figure 6:
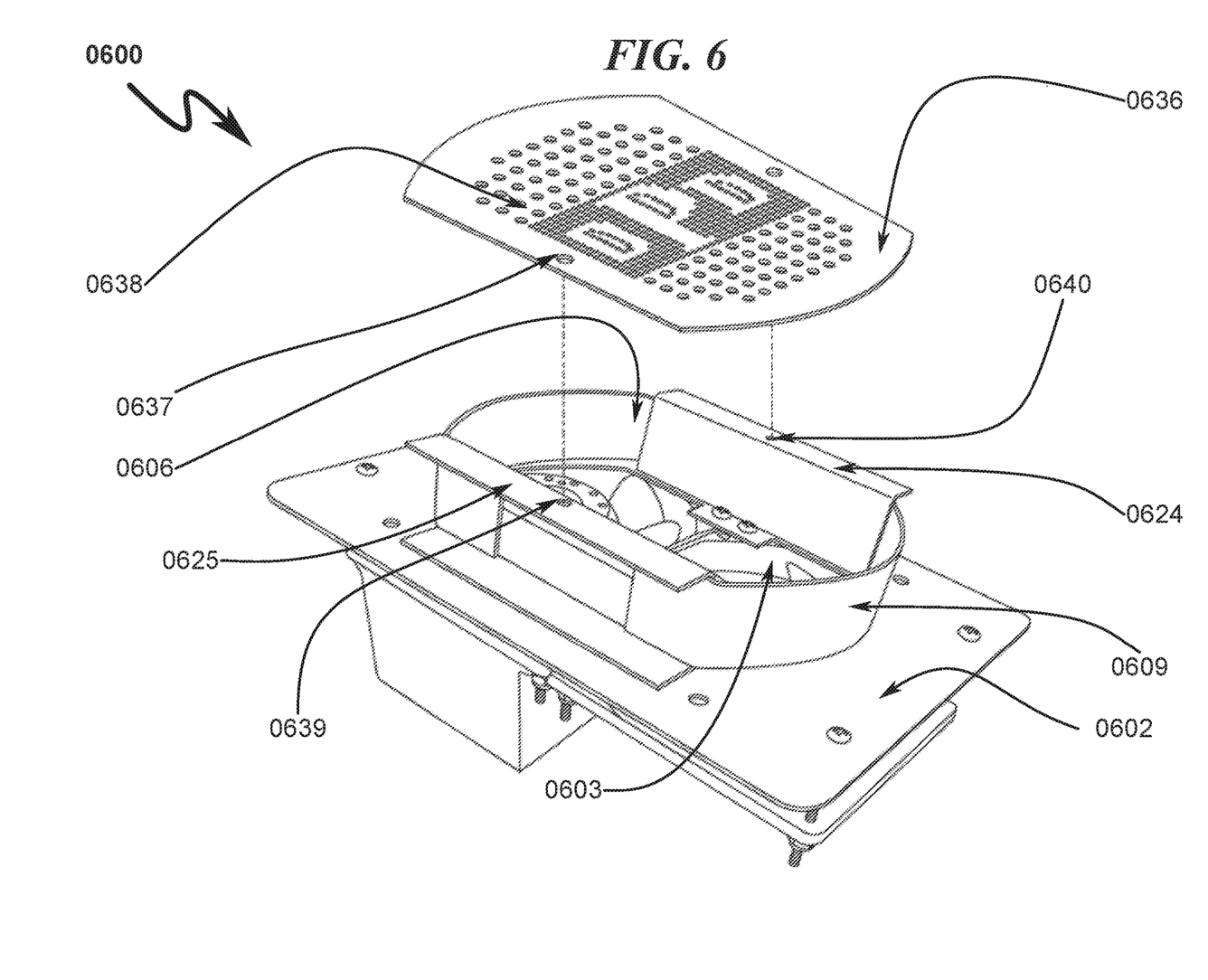
FIG. 6 is a perspective view of the rear partition mounted cooling device depicting the top and rear portions of the device with the cover suspended above the device.

FIG. 6 sets forth a perspective view 0600 of an exemplary embodiment from the top and rear of the present disclosure with a cover plate 0636 suspended above the invention. The cover plate 0636 has the same general shape outline as the attachment plate(s) 0609. When the cover plate 0636 is positioned correctly in place, it is parallel to and centrally located directly over the centrally located aperture 0606. In an exemplary embodiment, the cover plate 0636 has two fastener apertures 0637 that are on opposite sides of the same plane from each other on the cover plate 0636, and each fastener aperture is equidistant from either end of the cover plate. In addition, when the cover plate 0636 is correctly coupled with the invention, each fastener aperture centrally aligns with either the upper lip of the cover bracket 0624 aperture 0640 or with the upper lip of the cover bracket aperture 0639. Both of the fastener apertures 0637, the upper lip of cover bracket aperture 0640, and the upper lip of cover bracket 0625 aperture 0639, have equal diameters and have a sufficient radius such that a variety of fasteners can be used to secure the cover plate to the invention. An alternate embodiment has the cover plate 0636 fastened directly to the mounting plate 0602 or the fan unit 0603. The cover plate 0636 is not required for the device and can be constructed of any rigid material. On the surface of the cover plate 0636, there are a multitude of apertures 0638 of various sizes. In an exemplary embodiment, none of the apertures 0638 are larger than a half a cm in diameter, but alternate embodiments can have larger apertures 0638. The purpose of the apertures 0638 is to allow air to flow into the invention but screen larger objects from entering into the invention.

FIG. 7 sets forth a perspective view 0700 of an alternate embodiment of the present disclosure. The cover plate 0743 has a multitude of micro-apertures 0742 that penetrate through the entire cover plate 0743 and allow air to pass through into the fan housing 0741. The fan housing 0741 has a top plate 0753 and bottom plate 0754 that are parallel to each other. A back plate 0755 connects along its top edge and bottom edge perpendicularly to the top plate 0753 and the bottom plate 0754. The fan angle plates 0756 couple along their edges perpendicular to the top plate 0753 and the bottom plate 0754. In addition, in a preferred embodiment, the fan angle plates 0756 couple along their edge at a forty-five-degree angle to the back plate 0755, but are not limited to a forty-five-degree angle.

FIG. 8 sets forth a perspective view 0800 of an alternate embodiment of the present disclosure with the cover plate removed. Inside the fan housing 0841 is a first fan 0845 and a second fan 0846. In alternative embodiments, a back plate 0855 can have an offset block (not shown) that allows the first fan 0845 and its first fan enclosure 0847, as well as the second fan 0846 and its second fan enclosure 0848 to be set at a specified angle offset from each other. The first fan 0845 and the second fan 0846 are set at approximately a ninety-degree angle relative to each other, but are not limited to a ninety-degree angle. In between the first fan 0845 and the second fan 0846 is a partition wall 0844. If the first fan 0845 and the second fan 0846 are set to move air in opposite directions, the partition wall 0844 will make sure that air from an at least one aperture of the first fan 0850 does not mix with the air from an at least one aperture for the second fan 0849. The partition wall is not required for the device and may be constructed from any material.

FIG. 9 sets forth a bottom view 0900 of an alternate embodiment of the present disclosure. Air that enters into a fan housing 0941 can either go through an at least one first fan 0945 or an at least one second fan 0946. The air that exits out through air aperture for an at least one first fan 0951 is at a ninety-degree angle to the air that exits out through the air aperture for an at least one second fan 0952, but the angle of the fan(s) are not limited to ninety-degree angles.

Figure 10:
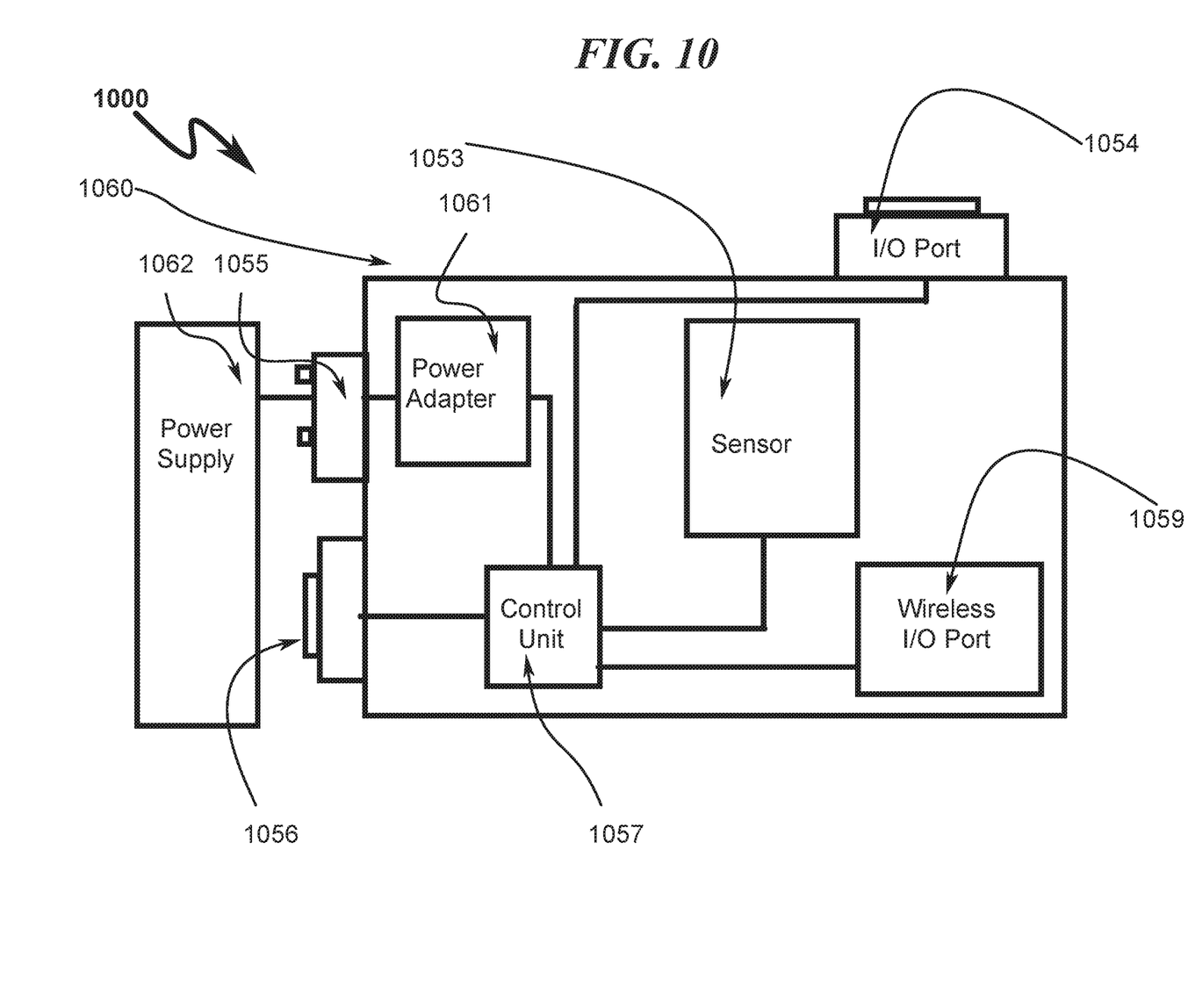
FIG. 10 is a diagram of an exemplary embodiment of the controller module.

FIG. 10 sets forth a diagram of an exemplary embodiment of a controller module 1000. The controller module allows for the control and/or power control of at least one fan of the present disclosure. Enclosed in a controller module case 1060 is a control unit 1057 which makes determinations such as, but not limited to, initiating the device, controlling the power level and/or flow, reading sensor data, activating at least one fan based on sensor data, activating at least one fan with a filter based on sensor data, or activating at least one fan with a desiccant based on sensor data. A power supply 1062 may be connected to the controller module 1000 via a power input port 1055 that allows power to be provided to the controller module 1000, the at least one fan, sensors, and/or other connected elements of the present disclosure or any combination thereof. The power supply 1062 can be many things including an Alternating Current (AC) power source, Direct Current (DC) power source, solar panel, wind turbine, fuel cell, hydrogen cell, or a battery. A power adapter 1061 may be present to modify and/or condition the power input to the controller module 1060. For example, power from an alternating current source or a power source that is not consistent may need to the conditioned to provide a normalized power output that can be utilized by the controller module 1000. The input/output port 1054 is coupled to the controller module and connected to the control unit 1057. The input/output port is not required for the controller module and may be left off. At least one sensor 1053 is coupled to the controller module to report to the control unit 1057. The at least one sensor 1053 is not required for the controller module and may not be found on alternative embodiments. In addition, there can be more than one sensor 1053 coupled to the controller module. One example of a possible sensor but not limited to the provided examples, would be a temperature sensor, but the sensor could collect data on any number of things such as humidity or rotational speed of the fans. There may also be a wireless input/output port 1059 coupled to the controller module and connected to the control unit 1057 that is capable of sending and receiving data wirelessly. The input and output functions do not have to be contained in the same component. There may also be an output port 1056 that is capable of sending data to any component or internally or externally connected component or device. There is not a specific configuration for the components shown in FIG. 10 and none of the components are required to be in the controller module case and/or directly connected to the controller module or control unit.

Figure 11:
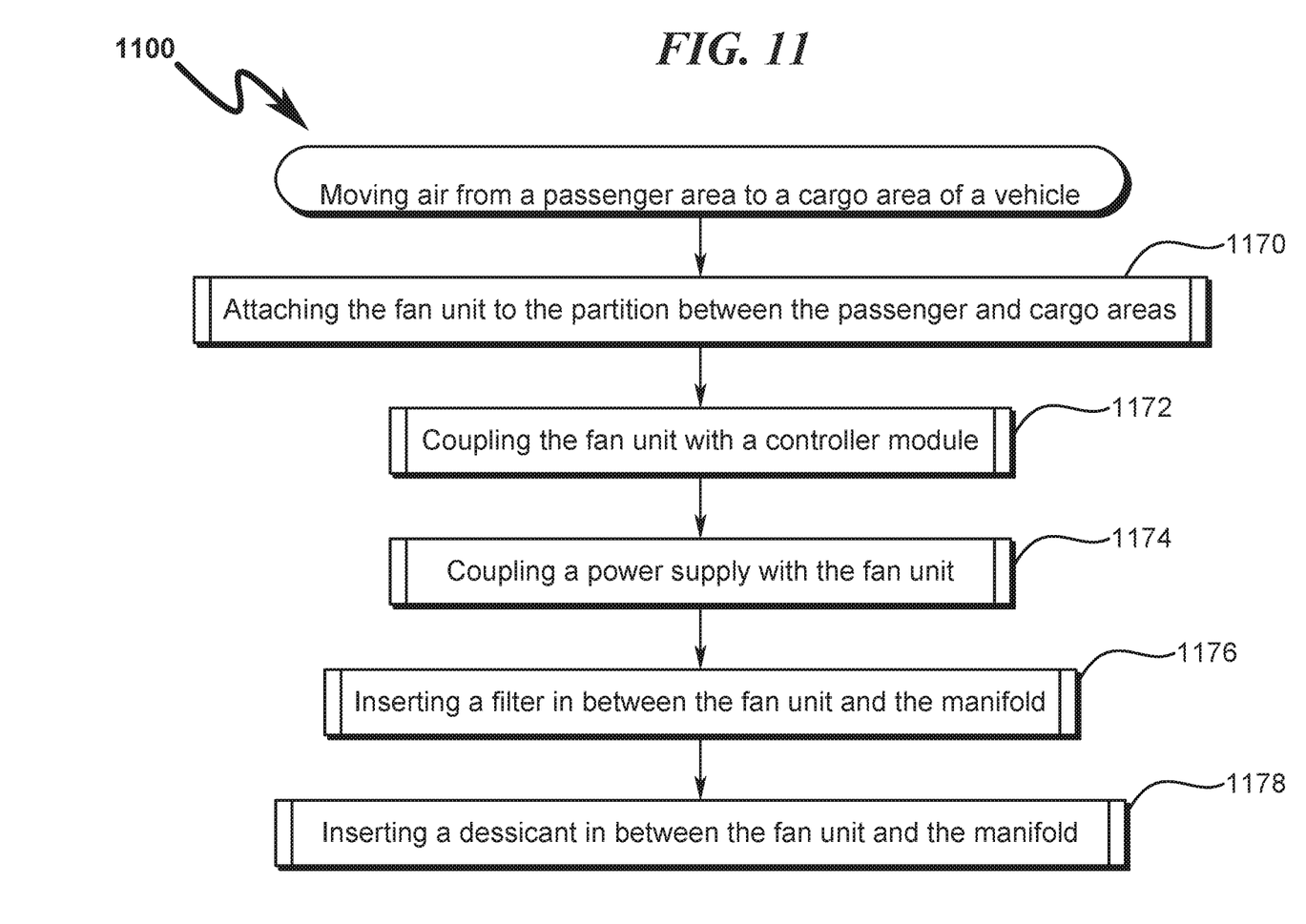
FIG. 11 is a flowchart illustrating a method of generating a device for moving air from a passenger area to a cargo area.

FIG. 11 sets forth a flowchart 1100 illustrating a method of a device for generating, circulating, or moving air from a passenger area to a cargo area of a vehicle. An exemplary embodiment of the method is the following: 1170 attaching the fan unit to the partition between the passenger and cargo areas, 1172 coupling the fan unit with a controller module, 1174 coupling a power supply to the fan unit, 1176 inserting a filter in between the fan unit and the manifold, and/or 1178 inserting a desiccant in between the fan unit and the manifold. Alternate embodiments may have fewer steps or may have more steps than those present in the above exemplary embodiment.

Figure 12:
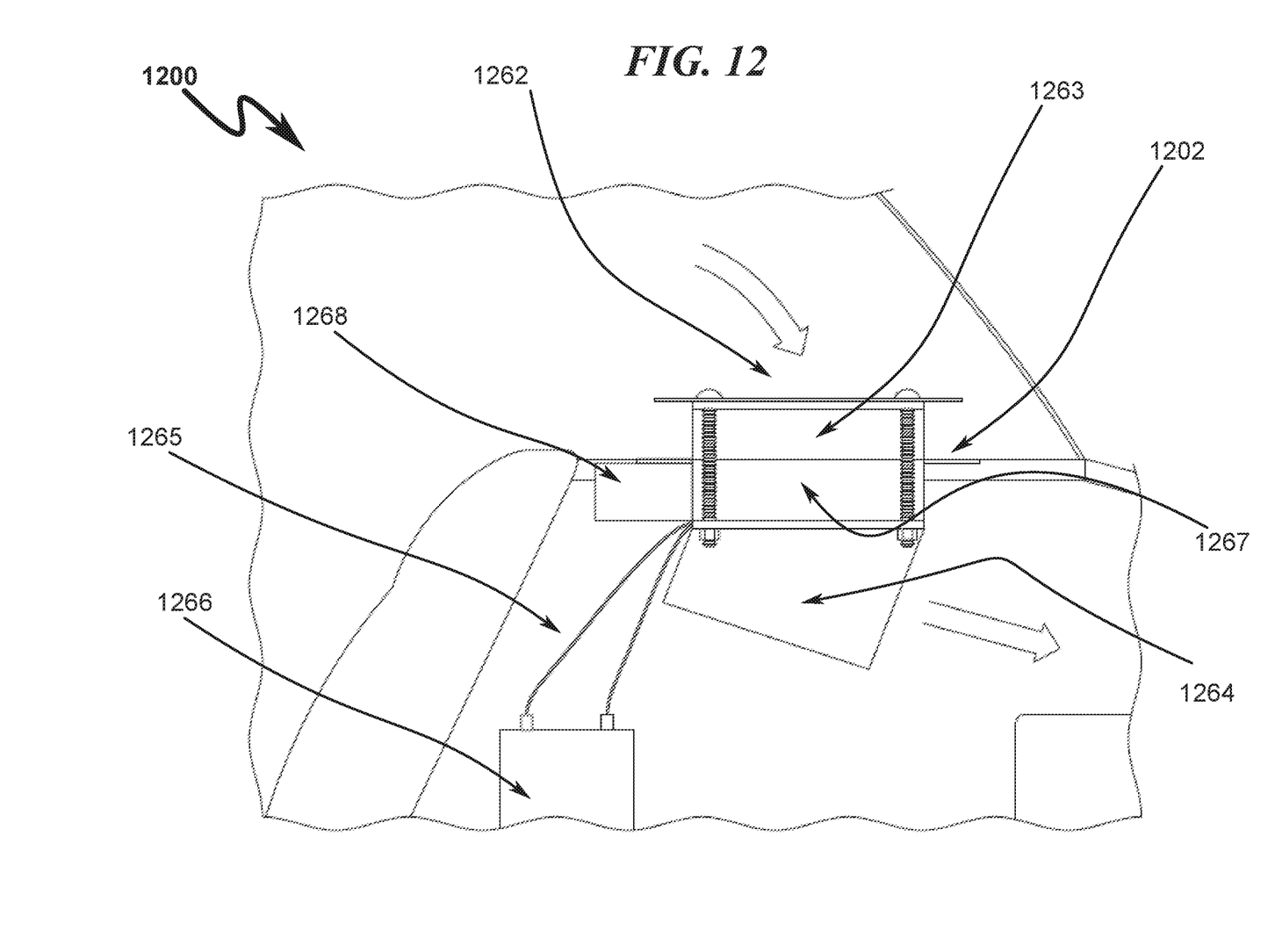
FIG. 12 is an environmental image of an exemplary embodiment of the present invention installed on the back deck of a sedan type vehicle viewed from the side.

FIG. 12 sets forth an environmental image 1200 of an exemplary embodiment of the present disclosure installed on the rear deck or partition of a vehicle viewed from the side. The present invention is placed in an opening in the rear deck or rear partition 1268 of a vehicle with the mounting plate 1202. The mounting plate 1202 is then fastened to the rear deck or partition 1268 of the vehicle. Alternate embodiments may have the mounting plate 1202 positioned underneath the rear deck or partition and/or fastened via at least one fastener. In addition, a vehicle may have a different sort of partition in between the passenger area and the cargo area other than a rear deck, and alternate versions of mounting plate 1202 other than the one shown in FIG. 12 may be used. In alternative embodiment, the device of the present disclosure may be horizontally orientated, for example, placed just above the floorboard of the passenger area of a vehicle. In addition, the mounting plate is not required, and alternate embodiments may not have it included in the present invention.

The present invention is connected through wires 1265 to a power supply 1266. The power supply 1266 could be a variety of power supplies such as, but not limited to Alternating Current (AC) power source, Direct Current (DC) power source, solar panel, wind turbine, fuel cell, hydrogen cell, or a battery. It's positioning and method for connecting power to the device could be altered as well. In the exemplary embodiment, air is circulated into the device through a cover plate 1262. Then the air passes through an attachment standoff 1263 before passing through a fan-housing unit 1267. Ultimately, the air is directed out of the device by a directional manifold 1264. Alternate embodiments could can different configurations such as the cover plate underneath the input shaft, or the device may not have a directional manifold 1264.

While this disclosure has been particularly shown and described regarding preferred embodiments, it will be understood by those skilled in the art that various changes in form and detail may be made therein without departing from the spirit and scope of the invention. The inventors expect skilled artisans to employ such variations as appropriate, and the inventors intend the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. An environmental control unit for use in a vehicle said environmental control unit comprising:
   at least one fan having a fan enclosure for each of the at least one fan, and configured to couple by at least one fastener;
   a mount for mounting each of the fan enclosure to a partition in a predefined location between a passenger area and a cargo area of the vehicle so that the at least one fan can circulate air between the passenger area to the cargo area from below the partition, wherein the mount has an upper surface with at least one cover bracket coupled to it to keep a cover above any materials along the partition, and a lower surface with the fan enclosure coupled to the lower surface;
   a controller module for engaging the at least one fan; and
   a directional manifold coupled to the fan enclosure for directing air from the passenger area to a specified portion of the cargo area.

2. The environmental control unit according to claim 1 further comprising:
   an air filter to filter the air being circulated by the device.

3. The environmental control unit according to claim 1 further comprising:
   a desiccant to reduce the relative humidity of the air that is being circulated by the device.

4. The environmental control unit according to claim 1 further comprising:
   at least one sensor connected to the controller module for detecting surrounding or environmental conditions.

5. The environmental control unit according to claim 1 further comprising:
   a power source connected to the controller module to provide power to the device.

6. The environmental control unit according to claim 5 wherein the power source is a battery.

7. The environmental control unit according to claim 5 wherein the power source is a solar panel.

8. The environmental control unit according to claim 1 wherein the fan enclosure is coupled to the mount by the at least one fastener.

9. The environmental control unit according to claim 1 wherein the cover further comprises:
   apertures penetrating the cover and the cover being coupled to the at least one cover bracket.

10. The environmental control unit according to claim 1 wherein the directional manifold is a rigid manifold for directing air into the cargo area.

11. The environmental control unit according to claim 1 wherein the directional manifold is a flexible manifold for directing air into the cargo area.

12. The environmental control unit according to claim 1 further comprising:
   a shaped shaft configured to couple with the at least one fan, wherein an input aperture and an output aperture of the shaft are centrally aligned with the center of the at least one fan to direct air into the at least one fan.

13. The environmental control unit according to claim 1 wherein the controller module further comprises:
   one or more ports connected to the controller module capable of sending data or receiving data or both;
   wherein the plurality of ports are capable of communicating through a physical connection or wireless connection or both.

14. A method for an environmental control unit in a vehicle causing air to be moved from an environmentally-controlled passenger area into a cargo area with a partition between the passenger area and the cargo area said method comprising:
   attaching a fan unit, which contains at least one fan, to the partition with a mount in between the environmentally controlled passenger area and the cargo area and the fan unit being within the cargo area, wherein the mount has at least one cover bracket coupled to an upper surface of the mount and the at least one cover bracket having a height equal or greater than the materials along the partition, and the at least one cover bracket passes through an opening in the partition;
   coupling the fan unit with a controller module to control when the fan unit operates according to the temperature present in the cargo area;
   coupling a power supply to the fan unit to power to the fan unit even when the vehicle is not turned on; and
   attaching a manifold that extends into the cargo area, to the fan unit for directing air exiting the fan unit toward a specific location in the cargo area.

15. The method of claim 14 further comprising:
   inserting a filter in between the fan unit and the manifold to filter the air passing through the fan unit.

16. The method of claim 14 further comprising:
   inserting a desiccant in between the fan unit and the manifold to reduce the relative humidity of the air passing through the fan unit.

* * * * *